(12) United States Patent
Baik et al.

(10) Patent No.: US 12,352,983 B2
(45) Date of Patent: Jul. 8, 2025

(54) LIQUID LENS AND LIQUID LENS ASSEMBLY

(71) Applicant: LG INNOTEK CO., LTD., Seoul (KR)

(72) Inventors: Jung Shik Baik, Seoul (KR); Do Won Yi, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 610 days.

(21) Appl. No.: 17/765,664

(22) PCT Filed: Sep. 28, 2020

(86) PCT No.: PCT/KR2020/013279
§ 371 (c)(1),
(2) Date: Mar. 31, 2022

(87) PCT Pub. No.: WO2021/066489
PCT Pub. Date: Apr. 8, 2021

(65) Prior Publication Data
US 2022/0365253 A1 Nov. 17, 2022

(30) Foreign Application Priority Data

Oct. 1, 2019 (KR) .......................... 10-2019-0121609

(51) Int. Cl.
*G02B 3/14* (2006.01)
(52) U.S. Cl.
CPC ...................................... *G02B 3/14* (2013.01)

(58) Field of Classification Search
CPC ...... G02B 3/12–14; G02B 26/004–005; G02B 5/005; G02C 7/085
See application file for complete search history.

(56) References Cited

U.S. PATENT DOCUMENTS

| | | | |
|---|---|---|---|
| 7,324,287 B1 * | 1/2008 | Gollier | G02B 3/14 359/666 |
| 7,643,217 B2 * | 1/2010 | Yokoyama | G02B 26/004 359/666 |
| 2007/0279758 A1 * | 12/2007 | Jiang | G02B 3/14 359/666 |
| 2008/0257435 A1 * | 10/2008 | Large | G02B 26/004 137/806 |
| 2010/0118414 A1 * | 5/2010 | Bolis | G02B 3/14 359/666 |
| 2010/0202054 A1 | 8/2010 | Niederer | |
| 2010/0232161 A1 | 9/2010 | Aschwanden et al. | |

(Continued)

FOREIGN PATENT DOCUMENTS

KR 10-0723244 B1 5/2007
KR 10-2010-0040316 A 4/2010
(Continued)

*Primary Examiner* — Nicholas R. Pasko
(74) *Attorney, Agent, or Firm* — Birch, Stewart, Kolasch & Birch, LLP

(57) ABSTRACT

Provided is a liquid lens assembly. A liquid lens according to an aspect of the present invention comprises: a first plate including a cavity; a first liquid which is conductive and disposed in the cavity; a second liquid which is non-conductive and disposed in the cavity; and a membrane disposed between the first liquid and the second liquid.

20 Claims, 4 Drawing Sheets

(56) References Cited

U.S. PATENT DOCUMENTS

| | | | |
|---|---|---|---|
| 2012/0026596 A1* | 2/2012 | Berge | G02B 26/005 |
| | | | 359/665 |
| 2014/0194750 A1 | 7/2014 | Lee et al. | |
| 2019/0049715 A1* | 2/2019 | Phipps | G02B 3/14 |
| 2019/0377172 A1 | 12/2019 | Karam | |
| 2021/0010898 A1* | 1/2021 | Gutleben | G01L 27/002 |
| 2021/0356768 A1* | 11/2021 | Hamlaoui | G02B 26/004 |

FOREIGN PATENT DOCUMENTS

| | | |
|---|---|---|
| KR | 10-2018-0131524 A | 12/2018 |
| KR | 10-2019-0021353 A | 3/2019 |
| WO | WO2018/148283 A1 | 8/2018 |

* cited by examiner

LIQUID LENS AND LIQUID LENS ASSEMBLY

CROSS REFERENCE TO RELATED APPLICATIONS

This application is the National Phase of PCT International Application No. PCT/KR2020/013279, filed on Sep. 28, 2020, which claims priority under 35 U.S.C. 119 (a) to Patent Application No. 10-2019-0121609, filed in the Republic of Korea on Oct. 1, 2019, all of which are hereby expressly incorporated by reference into the present application.

TECHNICAL FIELD

The present invention relates to a liquid lens and a liquid lens assembly.

BACKGROUND ART

A portable device user wants an optical device having a high resolution, small size, and various photographing functions, for example, an auto-focusing (AF) function, handshake correction or an optical image stabilizer (OIS) function. Such a photographing function may be implemented through a method of directly moving a lens by combining a plurality of lenses, but if the number of lenses is increased, the size of the optical device may be increased.

Autofocus and handshake correction functions are performed when several lens modules fixed to the lens holder and aligned with the optical axis are moved or tilted in an optical axis direction or in a vertical direction of the optical axis, and a separate lens driving device is used to drive the lens module. However, the lens driving device has high power consumption, requires driving members such as magnets and coils to drive a lens module, and requires a free space in response to the driving range of the lens module for driving the lens module, thereby increasing the thickness of the entire camera module and optical device.

Accordingly, research on a liquid lens that performs an autofocus and/or handshake correction function by electrically controlling the curvature of the interface between two kinds of liquids is being conducted.

DETAILED DESCRIPTION OF THE INVENTION

Technical Subject

An object of the present invention is to provide a liquid lens and a liquid lens assembly capable of electrically controlling the curvature of an interface between two kinds of liquids and enhancing the efficiency.

Technical Solution

A liquid lens according to an aspect of the present invention for achieving the above object comprises: a first plate comprising a cavity; a first liquid which is conductive and disposed in the cavity; a second liquid which is non-conductive and disposed in the cavity; and a membrane disposed between the first liquid and the second liquid.

In addition, the membrane may comprise an opening formed in a central region.

In addition, the membrane may be formed in the shape of a letter 'O'.

In addition, the membrane may be disposed in an entire region in which the conductive liquid and the non-conductive liquid are being in contact with each other.

In addition, the membrane may be formed in the shape of a circle or ellipse.

In addition, a refracting surface on which the conductive liquid and the non-conductive liquid are being formed may be convex toward the object side.

In addition, it may comprise a second plate disposed on one side of the first plate and a third plate disposed on the other side of the first plate, wherein each of the second plate and the third plate are being overlapped with at least one and more of the first liquid and the second liquid in an optical axis and may comprise a region being formed with a transparent material.

The first liquid which is conductive is disposed in contact with the second plate, wherein the second liquid which is non-conductive may be disposed to be in contact with the third plate.

At least a portion of the membrane may have elasticity, at least a portion of the membrane may be formed of a solid, and the membrane may contain a component different from the first liquid and the second liquid.

A liquid lens according to an aspect of the present invention comprises: a holder comprising a cavity; a first liquid which is conductive and disposed in the cavity; a second liquid which is non-conductive and disposed in the cavity; and a membrane disposed between the first liquid and the second liquid, wherein at least a portion of the membrane may be formed of a solid.

Advantageous Effects

Through the present embodiment, it is possible to provide a liquid lens and a liquid lens assembly capable of electrically controlling the curvature of an interface between two kinds of liquids and enhancing the efficiency.

BEST MODE

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (comprising technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may comprise the plural form unless specifically stated in the phrase, and when described as "at least one (or more than one) of A and B and C", it may comprise one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also comprise cases of being 'connected', 'coupled', or 'interconnected' due that another component between that other components.

In addition, when described as being formed or arranged in "on (above)" or "below (under)" of each component, "on (above)" or "below (under)" means that it comprises not only the case where the two components are directly in contact with, but also the case where one or more other components are formed or arranged between the two components. In addition, when expressed as "on (above)" or "below (under)", the meaning of not only an upward direction but also a downward direction based on one component may be comprised.

Hereinafter, the present invention will be described in more detail with reference to the accompanying drawings.

Figure 1:
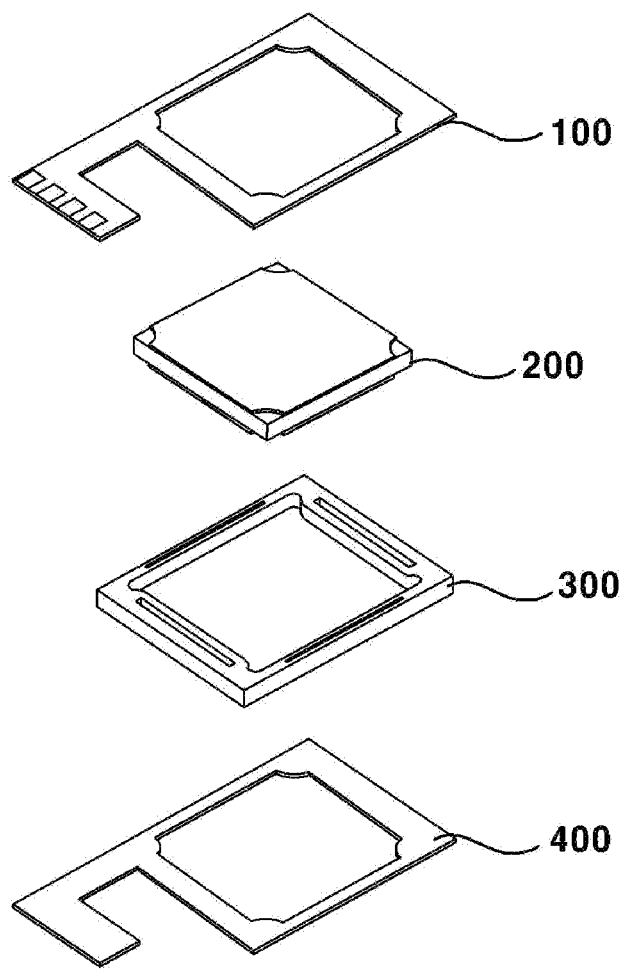
FIG. 1 is an exploded perspective view of a liquid lens assembly according to an embodiment of the present invention.
Figure 2:
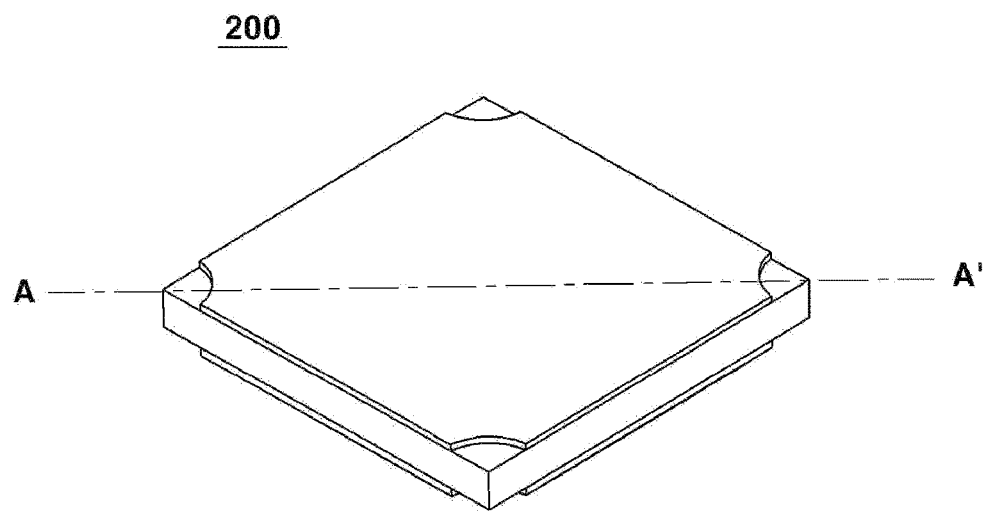
FIG. 2 is a perspective view of a liquid lens according to an embodiment of the present invention.
Figure 3:
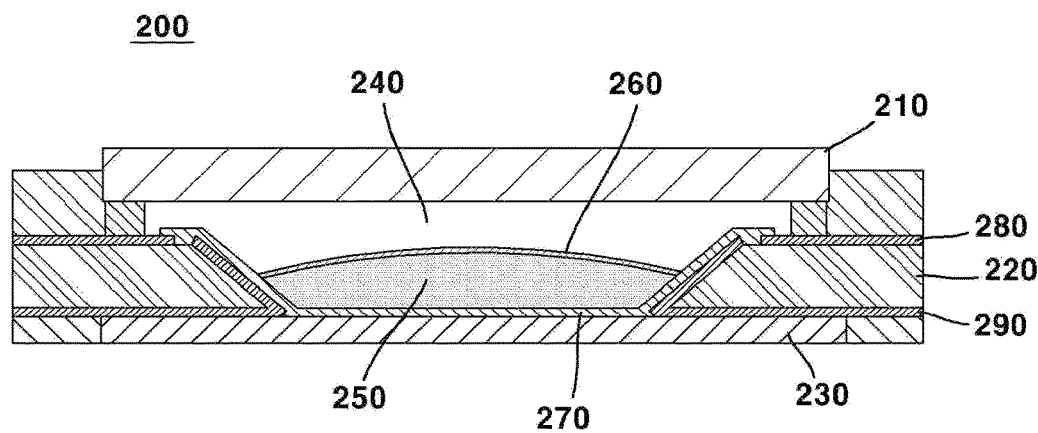
FIG. 3 is a cross-sectional view taken along line A-A' in FIG. 2.
Figure 4:
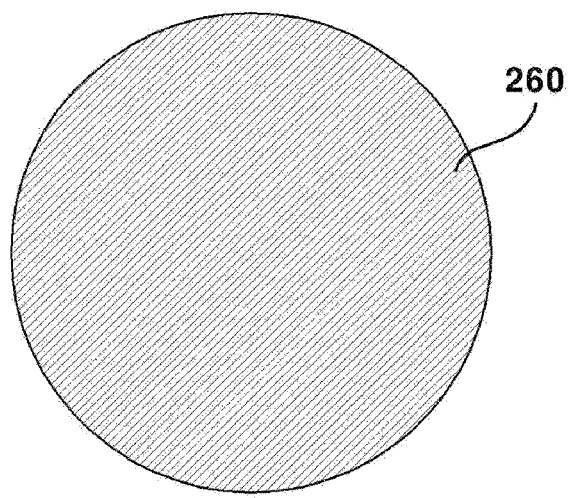
FIG. 4 is a plan view of a partial configuration of a liquid lens according to an embodiment of the present invention.
Figure 5:
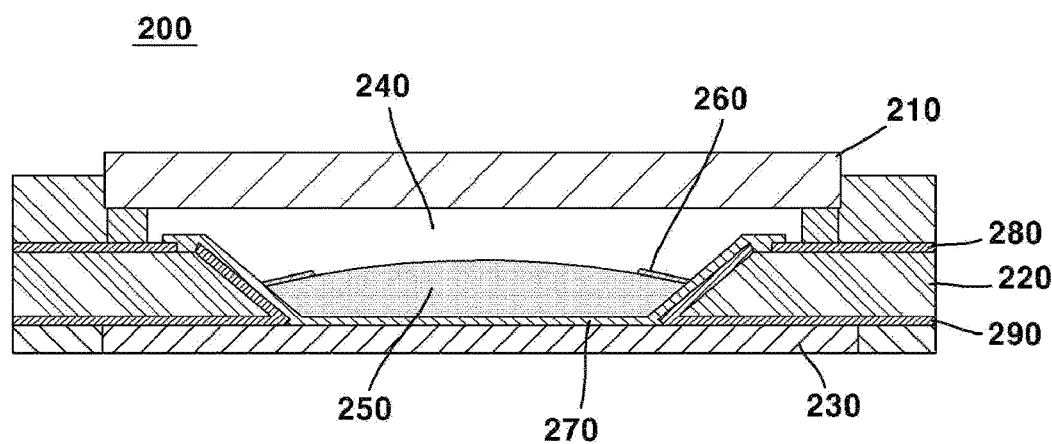
FIG. 5 is a cross-sectional view taken along line A-A' in FIG. 2.
Figure 6:
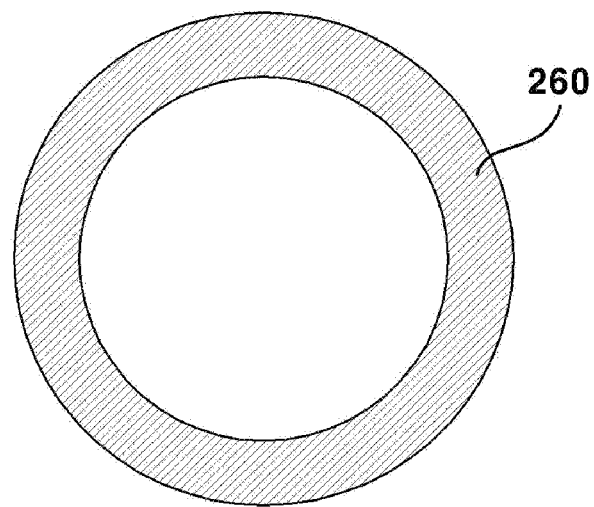
FIG. 6 is a plan view of a partial configuration of a liquid lens according to an embodiment of the present invention.

FIG. 1 is an exploded perspective view of a liquid lens assembly according to an embodiment of the present invention. FIG. 2 is a perspective view of a liquid lens according to an embodiment of the present invention. FIG. 3 is a cross-sectional view taken along line A-A' in FIG. 2. FIG. 4 is a plan view of a partial configuration of a liquid lens according to an embodiment of the present invention. FIG. 5 is a cross-sectional view taken along line A-A' in FIG. 2. FIG. 6 is a plan view of a partial configuration of a liquid lens according to an embodiment of the present invention.

Referring to FIGS. 1 to 6, the liquid lens assembly 10 according to an embodiment of the present invention may comprise a first electrode connection part 100, a liquid lens 200, and a second electrode connection part 400; however, it may be implemented except for some of these configurations, and does not exclude additional configurations. For example, the liquid lens assembly 10 may further comprise a spacer part 300.

The liquid lens assembly 10 may comprise a first electrode connection part 100. The first electrode connection part 100 may be disposed on one side of the liquid lens 200. The first electrode connection part 100 may be disposed on one surface of the liquid lens 200. The first electrode connection part 100 may be formed in a shape corresponding to the second electrode connection part 400. The first electrode connection part 100 may be overlapped with the second electrode connection part 400 in an optical axis direction. The first electrode connection part 100 may be electrically connected with an external component through a direct or indirect contact. The first electrode connection part 100 may be electrically connected to the liquid lens 200. The first electrode connection part 100 may be electrically connected to a first electrode 280.

The liquid lens assembly 10 may comprise a liquid lens 200. The liquid lens 200 may be disposed between the first electrode connection part 100 and the second electrode connection part 400. The liquid lens 200 may be electrically connected to the first electrode connection part 100 and the second electrode connection part 400. The liquid lens 200 may be disposed in the spacer part 300. When a voltage or current is applied to the liquid lens 200, the refractive surface of the liquid lens 200, specifically, the interface between the first liquid 240 and the second liquid 250 may be convex toward the object side. The water side surface and the image side surface of the liquid lens 200 may have a flat shape. Specifically, the curvature may not be formed on the water side surface and the image side surface of the liquid lens 200.

The liquid lens 200 may comprise a first plate 210, a second plate 230, a core member 220, a first liquid 240, a second liquid 250, and a membrane 260, an insulation layer 270, a first electrode 280, and the second electrode 290, but may be implemented except for some of these configurations, and additional configurations are not be excluded. The core member 220 may be a third plate comprising a cavity.

In addition, the core member 220 may be a core substrate.

The first plate 210 may be disposed on the second plate 230. The second plate 230 may be disposed below the first plate 210. The core member 220 may be disposed between the first plate 210 and the second plate 230. A cavity in which the first liquid 240 and the second liquid 250 are disposed may be formed in a space between the first plate 210 and the second plate 230 and the core member 220. The first electrode 280 may be disposed between the first plate 210 and the core member 220. The second electrode 290 may be disposed between the second plate 230 and the core member 220. The inner side surface of the core member 220 may comprise a first opening having a preset inclined surface. At least a portion of the first plate 210, the second plate 230, and the core member 220 may be formed of a transparent material. At least a portion of the first plate 210, the second plate 230, and the core member 220 may be formed of a glass material. The central region of the first opening may be disposed to face the object side. An edge region of the first opening may be disposed to face an image side.

The first liquid 240 may be a conductive liquid. The second liquid 250 may be a non-conductive liquid. For example, the first liquid 240 may be water. The second liquid 250 may be oil. The refractive surface may be formed between the first liquid 240 and the second liquid 250. An optical member 260 may be disposed between the first liquid 240 and the second liquid 250.

The liquid lens assembly may comprise an optical member 260. The optical member 260 may be a light transmitting material. The optical member 260 may be an elastic member 260. The optical member 260 may be a membrane 260.

The membrane 260 may be disposed between the first liquid 240 and the second liquid 250. Referring to FIGS. 3 and 4, the membrane 260 may be disposed in the entire region between the first liquid 240 and the second liquid 250. Through this, a wave front error (WFE) that occurs when the interface between the first liquid 240 and the second liquid 250 changes when a current is applied to the first and second electrodes 280 and 290 can be eliminated. The membrane 260 may be a thin film. The membrane 260 may be formed of a transparent material. The permeability of the membrane 260 may be 0.97 or more. The membrane 260 may be formed in the shape of a circle or ellipse. In addition, although not illustrated, a groove may be comprised on the outer periphery of the membrane 260, and a plurality of grooves may be formed.

Referring to FIGS. 5 and 6, the membrane 260 may comprise an opening formed in a central region. The opening of the membrane 260 may be formed in a region between the first liquid 240 and the second liquid 250 except for an edge region. The membrane 260 may be formed in the shape of a letter 'o'. The membrane 260 may be formed in the shape of a donut. When a current is applied to the first and second electrodes 280 and 290 to change the interface between the first liquid 240 and the second liquid 250, a wave front error (WFE) mainly occurs in an edge region among regions adjacent to the first liquid 240 and the second liquid 250. That is, by forming the opening in the central region of the membrane 260, the wave front error can be reduced, and at the same time, the transmittance of light passing through the liquid lens 200 can be increased, and the cost of the product can be reduced.

The first electrode 280 may be disposed below the first plate 210. The first electrode 280 may be disposed in a partial region of the lower surface of the first plate 210. The first electrode 280 may be disposed between the first plate 210 and the core member 220. The first electrode 280 may be in direct contact with the first liquid 240. The first electrode 280 may be electrically connected to the first electrode connection part 100. The first electrode 280 may be exposed to the outside in at least one region of the outer periphery of the first plate 210.

The second electrode 290 may be spaced apart from the first electrode 280. The second electrode 290 may be disposed between the second plate 230 and the core member 220. The second electrode 290 may be disposed on the inner side surface of the core member 220. A portion of the second electrode 290 may be disposed between the second plate 230 and the core member 220, and another portion may be disposed on an inner side surface of the core member 220. The second electrode 290 may be exposed to the outside in at least one region of the outer periphery of the second plate 230.

The first and second electrodes 280 and 290 may apply an electrical signal being received from the outside in order to control a refracting surface between the first liquid 240 and the second liquid 250. The first and second electrodes 280 and 290 may be formed of a conductive material. For example, the first and second electrodes 280 and 290 may be made of metal. The first and second electrodes 280 and 290 may be formed of a thin film. The first and second electrodes 280 and 290 may be vacuum deposited on at least one among the first plate 210, the second plate 230, and the core member 220. The first and second electrodes 280 and 290 may be formed of a transparent material. The control signal applied to the first and second electrodes 280 and 290 may be a pulse width modulation (PWM) signal. The driving voltage of the first and second electrodes 280 and 290 may be 70 V or less.

The insulation layer 270 may be disposed between the first liquid 240 and the second electrode 290. The insulation layer 270 may be disposed between the second liquid 250 and the second electrode 290. The insulation layer 270 may be disposed between a partial region of the first electrode 280 and the first liquid 240. The insulation layer 270 may be formed as a thin film. The insulation layer 270 may be formed by being stacked on at least a portion among the surfaces of the first electrode 280 and/or the second electrode 290. The insulation layer 270 may be formed with a transparent material.

The liquid lens assembly 10 may comprise a spacer part 300. The spacer part 300 may be disposed between the first electrode connection part 100 and the second electrode connection part 400. The liquid lens 200 may be disposed in the spacer part 300. The spacer part 300 may comprise a second opening in which the liquid lens 200 is disposed. The spacer part 300 may accommodate the liquid lens 200.

The liquid lens assembly 10 may comprise a second electrode connection part 400. The second electrode connection part 400 may be disposed on the other side of the liquid lens 200. The second electrode connection part 400 may be disposed on the other surface of the liquid lens 200. The second electrode connection part 400 may be formed in a shape corresponding to the first electrode connection part 100. The second electrode connection part 400 may be overlapped with the first electrode connection part 100 in an optical axis direction. The second electrode connection part 400 may be electrically connected to an external component through direct or indirect contact. The second electrode connection part 400 may be electrically connected to the liquid lens 200. The second electrode connection part 400 may be electrically connected to the second electrode 290.

The core member 220 may be a 'third plate'. The first plate 210, the second plate 230, and the third plate use 'first, second, and third' to distinguish them from one another, and one among the three plates may be referred to as a 'first plate', the other may be referred to as a 'second plate', and the other may be referred to as a 'third plate'.

The membrane 260 may have an outer periphery in the shape of a circle or ellipse. The opening of the membrane 260 is concentric with the outer periphery of the membrane 260 and may be formed in the shape of a circle having a smaller diameter than the outer periphery of the membrane 260. Each of the second plate and the third plate is overlapped with at least one among the first liquid 240 and the second liquid 250 in an optical axis and may comprise a region formed of a transparent material.

The first liquid 240 which is conductive may be disposed in contact with the second plate. The second liquid 250 which is non-conductive may be disposed in contact with the third plate. At this time, the second plate may be the first plate 210 and the third plate may be the second plate 230. Meanwhile, as a modified embodiment, the first liquid 240 is non-conductive and the second liquid 250 may be conductive.

At least a portion of the membrane 260 may have elasticity. At least a portion of the membrane 260 may be formed of a solid. The membrane 260 may comprise a component different from that of the first liquid 240 and the second liquid 250.

The liquid lens according to the present embodiment may comprise a holder comprising a cavity. At this time, the holder may comprise a first plate 210, a second plate 230, and a core member 220. The holder may be a 'case'. The holder may be a 'housing'.

Although embodiments of the present invention have been described with reference to the accompanying drawings, those of ordinary skill in the art to which the present invention belongs will be able to understand that the present invention can be embodied in other specific forms without changing its technical spirit or essential features. Therefore, it should be understood that the embodiments described above are illustrative in all respects and not restrictive.

The invention claimed is:

1. A liquid lens comprising:
   a holder comprising a cavity;
   a first liquid which is conductive and disposed in the cavity;
   a second liquid which is non-conductive and disposed in the cavity; and
   a membrane disposed between the first liquid and the second liquid,
   wherein the membrane comprises an opening formed in a central region, and
   wherein the membrane is formed to have a curvature corresponding to a curvature of an interface between the first liquid and the second liquid in the opening of the membrane.

2. The liquid lens of claim 1, wherein a permeability of the membrane is 0.97 or more.

3. The liquid lens of claim 1, wherein the opening of the membrane is concentric with an outer periphery of the membrane and is formed in a shape of a circle having a diameter smaller than the outer periphery.

4. The liquid lens of claim 1, wherein the second liquid comprises a first surface facing the first liquid, and
   wherein the membrane is disposed on an entire region of the first surface of the second liquid.

5. The liquid lens of claim 1, wherein an outer periphery of the membrane is formed in a shape of a circle or an ellipse.

6. The liquid lens of claim 1, wherein the interface between the first liquid and the second liquid is convex toward an object side when a voltage or current is applied to the liquid lens.

7. The liquid lens of claim 1, wherein at least a portion of the membrane has elasticity, and
   wherein the membrane comprises a component different from the first liquid and the second liquid.

8. The liquid lens of claim 1, wherein the second liquid comprises a region in which a diameter of the second liquid in a direction perpendicular to an optical axis increases as it approaches the first liquid.

9. The liquid lens of claim 1, wherein the membrane is a thin film formed of a transparent material.

10. The liquid lens of claim 1, wherein a curvature of an interface formed between the membrane and the second liquid corresponds to the curvature of the interface between the first liquid and the second liquid in the opening of the membrane.

11. The liquid lens of claim 1, wherein the holder comprises a core member, a first plate disposed at one side of the core member, and a second plate disposed at the other side of the core member, and
    wherein each of the first plate and the second plate comprises a region overlapped with at least one and more of the first liquid and the second liquid in an optical axis and formed with a transparent material.

12. The liquid lens of claim 11, wherein the first liquid is disposed to be in contact with the first plate.

13. The liquid lens of claim 11, comprising:
    a first electrode disposed between the first plate and the core member; and
    a second electrode disposed between the second plate and the core member,
    wherein the first electrode is in direct contact with the first liquid.

14. A lens assembly comprising:
    a first electrode connection part;
    a second electrode connection part spaced apart from the first electrode connection part; and
    the liquid lens of claim 1 disposed between the first electrode connection part and the second electrode connection part,
    wherein the liquid lens is electrically connected to the first electrode connection part and the second electrode connection part.

15. A camera module comprising the lens assembly of claim 14.

16. A liquid lens comprising:
    a holder comprising a cavity;
    a first liquid which is conductive and disposed in the cavity;
    a second liquid which is non-conductive and disposed in the cavity; and
    a membrane disposed between the first liquid and the second liquid,
    wherein the membrane is formed of a transparent material,
    wherein the membrane comprises an opening formed in a central region, and
    wherein the membrane is formed to have a curvature corresponding to a curvature of an interface between the first liquid and the second liquid in the opening of the membrane.

17. The liquid lens of claim 16, wherein the interface between the first liquid and the second liquid is convex toward an object side when a voltage or current is applied to the liquid lens.

18. The liquid lens of claim 16, wherein the opening of the membrane is concentric with an outer periphery of the membrane and is formed in a shape of a circle having a diameter smaller than the outer periphery.

19. The liquid lens of claim 16, wherein a curvature of an interface formed between the membrane and the second liquid corresponds to the curvature of the interface between the first liquid and the second liquid in the opening of the membrane.

20. A liquid lens comprising:
    a holder;
    a conductive liquid disposed in the holder;
    a non-conductive liquid disposed in the holder; and
    a membrane disposed between the conductive liquid and the non-conductive liquid,
    wherein the membrane comprises an opening, and
    wherein the membrane is formed to have a curvature corresponding to a curvature of an interface between the first liquid and the second liquid in the opening of the membrane.

* * * * *